United States Patent [19]

Izutsu et al.

[11] Patent Number: 4,703,074

[45] Date of Patent: Oct. 27, 1987

[54] POLYPHENYLENE SULFIDE RESIN COMPOSITION CONTAINING MIXTURE OF SILICON COMPOUNDS

[75] Inventors: Hitoshi Izutsu, Kumatori; Toshihide Yamaguchi, Izumi-ohtsu, both of Japan

[73] Assignee: Dainippon Ink and Chemicals, Inc., Tokyo, Japan

[21] Appl. No.: 863,854

[22] Filed: May 16, 1986

[30] Foreign Application Priority Data

May 22, 1985 [JP] Japan .................................. 60-108339

[51] Int. Cl.$^4$ ............................................... C08K 5/54
[52] U.S. Cl. ........................................ 524/262; 524/81; 524/264; 524/265; 524/443; 524/451; 524/609

[58] Field of Search ............... 524/262, 264, 265, 443, 524/451, 609, 81

[56] References Cited

U.S. PATENT DOCUMENTS

| | | | |
|---|---|---|---|
| 4,448,918 | 5/1984 | Leland | 524/262 |
| 4,451,601 | 5/1984 | Blackwell | 524/262 |
| 4,481,665 | 11/1984 | Dix | 524/262 |
| 4,528,310 | 7/1985 | Blackwell | 524/262 |

*Primary Examiner*—Harold D. Anderson
*Attorney, Agent, or Firm*—Sherman and Shalloway

[57] ABSTRACT

A polyphenylene sulfide resin composition comprising (1) a polyphenylene sulfide resin having a melt flow value of at least 1,000 g/min., (2) silicic acid and/or a silicate, and (3) a silane compound composed of a vinylsilane and an aminosilane and/or an epoxysilane.

9 Claims, No Drawings

POLYPHENYLENE SULFIDE RESIN COMPOSITION CONTAINING MIXTURE OF SILICON COMPOUNDS

This invention relates to a polyphenylene sulfide resin composition having improved moisture resistance, mechanical properties and moldability and being particularly suitable for encapsulating electronic component parts. More specifically, this invention relates to a polyphenylene sulfide resin composition comprising a low-molecular-weight polyphenylene sulfide resin, silicic acid and/or a silicate, a vinylsilane and an aminosilane and/or an epoxysilane.

Polyphenylene sulfide resins have better heat resistance, chemical resistance, mechanical properties and electrical properties than other engineering plastics, and are utilized in various molding fields. In recent years, encapsulation of electronic component parts by polyphenylene sulfide resins has been studied. However, to avoid injury to the electronic component parts, it is necessary to lower the melt viscosity of the polyphenylene sulfide resin and to reduce their molecular weight. When such a polyphenylene sulfide resin is used as a blend with an inorganic filler, it is necessary to increase the moisture resistance of the blend.

Japanese Laid-Open Patent Publication No. 12861/1976 discloses the incorporation of a vinylalkoxysilane and glass fibers in a polyphenylene sulfide resin. If, however, the polyphenylene sulfide resin has a very low molecular weight represented by its melt flow value (316° C., 5 kg load, ASTM D-1238-74) of at least 1,000 g/min., the effect of the vinylalkoxysilane to increase the strength of the resin is much lower than that of another silane such as an aminosilane or an epoxysilane.

On the other hand, the moisture resistance of a low-molecular-weight polyphenylene sulfide resin composition containing silicic acid and/or a silicate can be increased by incorporating various silane compounds. However, the improving effect obtained by incorporating the aminosilane or epoxysilane has been found to be considerably low.

It is an object of this invention to provide a polyphenylene sulfide resin composition having markedly improved moisture resistance, mechanical properties and moldability.

As a result of extensive investigations, the present inventors have found that this object can be effectively achieved by incorporating both (a) a vinylsilane and (b) an aminosilane and/or an epoxysilane in a low-molecular-weight polyphenylene sulfide resin containing silicic acid and/or a silicate.

According to this invention, there are provided a polyphenylene sulfide resin composition comprising (1) a polyphenylene sulfide resin having a melt flow value of at least 1,000 g/min., (2) silicic acid and/or a silicate, and (3) a silane compound composed of (a) a vinylsilane and (b) an aminosilane and/or an epoxysilane; and an electronic component part encapsulated with the resin composition.

As the synergistic effect of using at least two silane compounds, the composition of this invention is free from the defect of reduced mechanical strength which occurs in the case of incorporating only the vinylsilane and from the defect of reduced moisture resistance which occurs in the case of incorporating only the aminosilane and/or the epoxysilane, and has excellent moisture resistance and mechanical strength and also excellent moldability.

The polyphenylene sulfide resin used in this invention is an uncrosslinked or partially crosslinked polyphenylene sulfide resin or a mixture of such polyphenylene sulfide resins, and has a melt flow value, measured in accordance with the method of ASTM D1238-74 (316° C., 5 kg load), of at least 1,000 g/min.

The polyphenylene sulfide resin is preferably a polyphenylene sulfide containing at least 70 mole % of structural units of the general formula

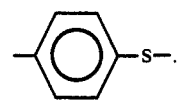

It may contain copolymer components such as a meta-linkage

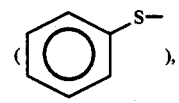

an ether linkage

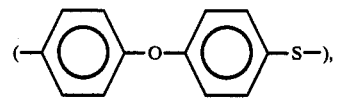

a sulfone linkage

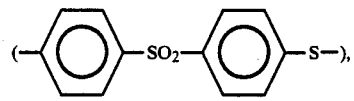

a biphenyl linkage

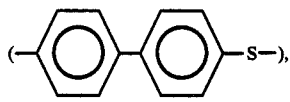

a substituted phenyl sulfide linkage

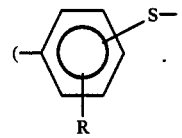

wherein R represents an alkyl group, a nitro group, a phenyl group, an alkoxy group, a carboxyl group or a metal carboxylate group), and a trifunctional phenyl sulfide linkage

When en electronic component part to be encapsulated is sensitive to exterior stresses, the polyphenylene sulfide resin preferably has a melt flow value of at least 3,000 g/min. and is uncrosslinked.

If the melt flow value of the polyphenylene sulfide resin is less than 1,000 g/min., the melt viscosity of the resulting resin becomes high and its flowability during molding is undesirably reduced.

Silicic acid used in this invention is composed of silicon dioxide, and the silicate is a salt formed between silicon dioxide and a metal oxide such as $Al_2O_3$, $B_2O_3$, $Fe_2O_3$, $Na_2O$, $K_2O$, MgO or CaO. Specific examples of these include amorphous or crystalline silica, silica beads, silica fibers, talc, clay, mica, asbestos, glass fibers, glass balloons, glass beads, calcium silicate, montmorillonite and bentonite. They may be in the form of fibers, spheres, irregularly-shaped objects, etc. Silica is especially preferred because it can be obtained in high purity with a lower coefficient of linear expansion than the other fillers. The number average length of a fibrous material such as glass fibers is usually not more than 500 micrometers, preferably not more than 100 micrometers, especially preferably not more than 80 micrometers, because fibrous materials having too large a number average length will reduce the melt viscosity of the resulting composition or will impair the performance of electronic component parts in encapsulation.

The amount of silicic acid and/or the silicate in the composition is preferably 15 to 80% by weight, and for encapsulation of electronic component parts, it is especially preferably 50 to 75% by weight from the standpoint of strength, dimensional stability and moldability.

The vinylsilane used in this invention is a silane compound having at least one vinyl group. Preferably, it is a compound represented by the general formula

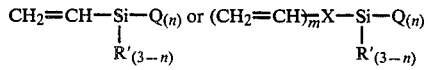

wherein R' represents a hydrocarbon group having 1 to 3 carbon atoms, preferably an alkyl group having 1 to 3 carbon atoms, Q is a hydrolyzable group having affinity for, or reactivity with, silicic acid and the silicate, for example an alkoxy group having 1 to 8 carbon atoms, an acyloxy group having 1 to 8 carbon atoms, or a halogen atom, X represents a hydrocarbon group having 1 to 15 carbon atoms such as an alkylene, arylene or aralkylene group, m is an integer of at least 1, preferably 1 or 2, and n is an integer of 1 to 3. Specific examples of the silane compound include vinyltriethoxysilane, vinyltrimethoxysilane, vinyltris(beta-methoxyethoxysilane), vinyltriacetoxysilane, 2-styrylethyltrimethoxysilane, N-beta-(N-vinylbenzylaminoethyl)-gamma-aminopropyltrimethoxysilane, allyltriethoxysilane, N-vinylbenzyl-gammaaminopropyltriethoxysilane, vinyltriphenoxysilane, trimethoxysilylpropylallylamine, vinyltris(t-butylperoxy)silane, vinyltris(trimethylsiloxy)silane, phenylvinyldimethoxysilane, vinyltrichlorosilane, vinyldimethylchlorosilane, and vinylethyldichlorosilane.

The aminosilane is preferably an alkoxysilane or a halosilane containing at least one substituted or unsubstituted amino group in the molecule. More preferably, it is a compound represented by the general formula

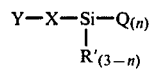

wherein Y is $NH_2$, NHR or $N(R)_2$, in which R represents a hydrocarbon group having 1 to 15 carbon atoms such as an alkylene, arylene or aralkylene group, X, R', Q and n are as defined above. Specific examples of the aminosilane include N-beta-(aminoethyl)-gamma-aminopropyltrimethoxysilane, N-beta-(aminoethyl)-gamma-aminopropylmethyldimethoxysilane, gamma-aminopropyltriethoxysilane, N-phenyl-gamma-aminopropyltrimethoxysilane, N,N-dimethylaminophenyltriethoxysilane, 1-trimethoxysilyl-2-1(p,m-aminomethyl)phenylethane, p-aminophenyltrimethoxysilane, aminoethylaminomethylphenethyltrimethoxysilane, gamma-aminopropyltrimethoxysilane, gamma-aminopropyldimethylethoxysilane, N,N'-diethyl-3-aminopropyltrimethoxysilane, 3-aminopropylmethyldiethoxysilane, bis[3-(triethoxysilyl)propyl]amine, bis[3-(trimethoxysilyl)propyl]ethylenediamine, and 4-aminobutyldimethylmethoxysilane.

The epoxysilane is preferably an alkoxysilane or halosilane having at least one epoxy group in the molecule, more preferably a compound of the general formula

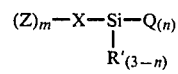

wherein Z is

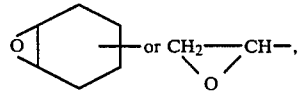

and X, R', Q, m and n are as defined above. Examples of the epoxysilane compound are beta-(3,4-epoxycyclohexyl)ethyltrimethoxysilane, gammaglycidoxypropyltrimethoxysilane, and gamma-glycidoxypropylmethyldiethoxysilane.

Preferably, the vinylsilane (a) and the aminosilane and/or epoxysilane (b) are used in a total amount of 0.01 to 10% by weight, more preferably 0.1 to 5% by weight, based on the weight of the entire composition. From the standpoint of the moisture resistance and mechanical strength of he resulting composition, the especially preferred total amount of the silane compounds is 0.1 to 3% by weight. The weight ratio of the vinylsilane (a) to the aminosilane and/or epoxysilane (b), (a):(b), is preferably from 10:90 to 99:1, more preferably from 20:80 to 95:5.

The composition of this invention may be prepared by various methods, for example a method which comprises mixing silicic acid and/or the silicate treated with the whole of the silane compound, with the polyphenylene sulfide resin at 280° to 400° C.; a method which comprises mixing silicic acid and/or the silicate treated with the vinylsilane alone, with the aminosilane and/or epoxysilane and the polyphenylene sulfide resin; and a method which comprises simultaneously mixing the silane compounds, the filler and the polyphenylene sulfide resin. Preferably, silicic acid and/or th silicate is pre-treated with part or the whole of the silane compounds at room temperature to 150° C., and then mixed with the remaining components.

It is possible to add known additives such as lubricants, mold releasing agents, stabilizers, coloring agents and corrosion inhibitors to the composition of this invention. Furthermore, in order to increase the reliability of encapsulated electronic component parts, a silicone oil modified with, for example, a vinyl group, a mercapto group, an amino group, an epoxy group, a carboxyl group, a fluoroalkyl group, a hydroxyl group or a polyether group, a styrene/butadiene random or block copolymer rubber or its hydrogenated product which is unmodified or modified with an acidic group, an amino group or an epoxy group, antimonic acid, bismuth oxide or zinc oxide may be added to the composition in an amount of 0.01 to 20% by weight based on the weight of the composition.

1.5 parts by weight of each of the silane compounds indicated in Table 1 were kneaded by an extruder at 330° C. The mixture was molded by an injection molding machine at a resin temperature of 330° C. and die temperature of 150° C. to test pieces for the measurement of physical properties. The properties of the test pieces were measured, and the results are shown in Table 1.

TABLE 1

| Composition No. | 1 | 2 | 3 | 4 | 5 | 6 | 7 |
| --- | --- | --- | --- | --- | --- | --- | --- |
| Weight ratio of vinyltriethoxysilane/gamma-aminopropyltriethoxysilane | 0/100 | 20/80 | 50/50 | 70/30 | 90/10 | 100/0 | 0/0 |
| Flexural strength (kg/cm$^2$) | 690 | 690 | 680 | 660 | 600 | 420 | 410 |
| Izod impact strength (without a notch; kg · cm/cm) | 6.5 | 6.4 | 6.4 | 6.2 | 5.6 | 3.7 | 3.7 |
| Volume inherent resistivity at 23° C. (ohms · cm) | $2 \times 10^{16}$ | $2 \times 10^{16}$ | $2 \times 10^{16}$ | $3 \times 10^{16}$ | $3 \times 10^{16}$ | $3 \times 10^{16}$ | $2 \times 10^{16}$ |
| Volume inherent resistivity at 23° C. (ohms · cm) after PCT (*1) for 100 hours | $2 \times 10^{12}$ | $5 \times 10^{13}$ | $8 \times 10^{14}$ | $1 \times 10^{15}$ | $3 \times 10^{15}$ | $1 \times 10^{15}$ | $10^{10}$ |

(Note):
Compositions Nos. 2 to 5 are in accordance with the present invention, and the others are for comparison.
(*1): Pressure cooker test at 121° C. and 2 atms.

EXAMPLE 2

Forty parts by weight of polyphenylene sulfide resin flow value 3900 g/min.) and 30 parts by weight of talc treated with 0.8 part by weight of each of the silane compounds indicated in Table 2 and 30 parts by weight of glass beads were kneaded and molded as in Example 1 to form test pieces. The properties of the test pieces were measured, and the results are shown in Table 2.

TABLE 2

| Composition No. | 8 | 9 | 10 | 11 | 12 | 13 | 14 |
| --- | --- | --- | --- | --- | --- | --- | --- |
| Vinyltrichlorosilane/beta-(3,4-epoxycyclohexyl)ethyltriethoxysilane (weight ratio) | 0/100 | 20/80 | 50/50 | 70/30 | 90/10 | 100/0 | 0/0 |
| Flexural strength (kg/cm$^2$) | 760 | 740 | 720 | 700 | 630 | 450 | 440 |
| Izod impact strength (without a notch; kg · cm/cm) | 7.1 | 6.8 | 6.4 | 6.0 | 5.2 | 5.2 | 4.1 |
| Volume inherent resistivity at 23° C. (ohms · cm) | $2 \times 10^{16}$ | $3 \times 10^{16}$ | $3 \times 10^{16}$ | $3 \times 10^{16}$ | $3 \times 10^{16}$ | $3 \times 10^{16}$ | $2 \times 10^{16}$ |
| Volume inherent resistivity at 23° C. (ohms · cm) after PCT for 100 hours | $1 \times 10^{13}$ | $1 \times 10^{14}$ | $8 \times 10^{14}$ | $2 \times 10^{15}$ | $3 \times 10^{15}$ | $2 \times 10^{15}$ | $10^{10}$ |
| Aluminum wiring corrosion time (hrs., on an average) (*1) | 20 | 38 | 46 | 48 | 53 | 31 | 11 |

(Note):
Compositions Nos. 9 to 12 are in accordance with this invention, and the others are for comparison.
(*1): An IC frame having fitted thereto an element for testing aluminum wiring corrosion was encapsulated. A direct current of 50 V was applied to the frame in steam at 121° C. and 2 atms. The average life time at which the rate of wiring breakage owing to corrosion of aluminum became 50% was measured (the practical evaluation of moisture resistance).

Since the resin composition of this invention has excellent moisture resistance, mechanical strength and moldability, it is useful as an encapsulation material for various electronic component parts such as IC, transistors, capacitors, resistors, diodes, triodes, thyristors, coils, varistors, connectors, transducers, quartz oscillators, fuses, rectifiers, power supplies, microswitches and composite structures of these components.

The following examples illustrate the present invention specifically.

EXAMPLE 1

Thirty-three parts by weight of polyphenylene sulfide resin (melt flow value 7100 g/min., 316° C., 5 kg load) and 67 parts by weight of fused silica treated with

What is claimed is:
1. A polyphenylene sulfide resin composition comprising
  (1) a polyphenylene sulfide resin having a melt flow value of at least 1,000 g/min.,
  (2) silicic acid, a silicate, or mixture thereof, and
  (3) a silane compound composed of (a) a vinyl lane and (b) an aminosilane, an epoxysilane or mixture thereof.
2. The composition of claim 1 wherein the polyphenylene sulfide resin has a melt flow value of at least 3,000 g/min.

3. The composition of claim 1 wherein silicic acid, the silicate salt, or mixture thereof is at least one material selected from the group consisting of amorphous or crystalline silica, silica beads, silica fibers, talc, mica, glass fibers, glass balloons, glass beads and calcium silicate.

4. The composition of claim 1 wherein the vinylsilane is a compound represented by the general formula

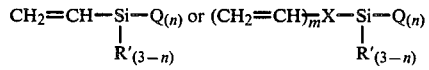

wherein R' represents a hydrocarbon group having 1 to 3 carbon atoms, Q represents a hydrolyzable group having affinity for, or reactivity with, silicic acid and the silicate, X represents a hydrocarbon group having 1 to 15 carbon taoms, m is an integer of at least 1, and n is an integer of 1 to 3.

5. The composition of claim 1 wherein the aminosilane is a compound represented by the general formula

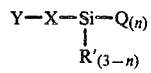

wherein Y is $NH_2$, NHR or $N(R)_2$ in which R represents a hydrocarbon group having 1 to 15 carbon atoms, R' represents a hydrocarbon group having 1 to 3 carbon atoms, Q represents a hydrolyzable group having affinity for, or reactivity with, silicic acid and the silicate, X represents a hydrocarbon group having 1 to 15 carbon atoms, m represents an integer of at least 1, and n represents an integer of 1 to 3.

6. The composition of claim 1 wherein the epoxysilane is a compound represented by the general formula

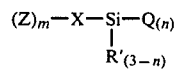

wherein Z is

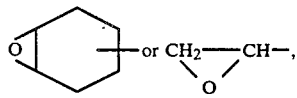

X represents a hydrocarbon group having 1 to 5 carbon atoms, R' represents a hydrocarbon group having 1 to 3 carbon atoms, Q represents a hydrolylzable group having affinity for, or reactivity with, silicic acid and the silicate, X represents a hydrocarbon group having 1 to 15 carbon atoms, m represents an integer of at least 1, and n represents an integer of 1 to 3.

7. The composition of claim 1 wherein the amount of silicic acid, the silicate, or mixture thereof is 15 to 80% by weight based on the weight of the composition.

8. The composition of claim 1 wherein the amount of the silane compound is 0.01 to 10% by weight based on the weight of the composition.

9. An electronic component part encapsulated with a polyphenylene sulfide resin composition comprising
(1) a polyphenylene sulfide resin having a melt flow value or at least 1,000 g/min.,
(2) silicic acid, a silicate, or mixture thereof, and
(3) a silane compound composed of a vinylsilane and
(b) an aminosilane, an epoxysilane, or mixture thereof.

* * * * *

UNITED STATES PATENT AND TRADEMARK OFFICE
CERTIFICATE OF CORRECTION

PATENT NO. : 4,703,074

DATED : October 27, 1987

INVENTOR(S) : HITOSHI IZUTSU, ET. AL.

It is certified that error appears in the above-identified patent and that said Letters Patent is hereby corrected as shown below:

<u>IN THE CLAIMS</u>

Column 6, claim 1, line 63, delete "vinyl lane", insert --vinylsilane--;

line 64, after "epoxysilane", insert --,--.

Column 7, claim 4, line 19, delete "taoms", insert --atoms--.

Signed and Sealed this

Nineteenth Day of April, 1988

Attest:

DONALD J. QUIGG

Attesting Officer

Commissioner of Patents and Trademarks